(12) United States Patent
Xu et al.

(10) Patent No.: US 8,993,073 B2
(45) Date of Patent: Mar. 31, 2015

(54) APPLYING BIAS VOLTAGE DURING FORMATION OF GRANULAR RECORDING MEDIA

(75) Inventors: Weilu Xu, San Jose, CA (US); Miaogen Lu, Fremont, CA (US); Mariana R. Munteanu, Santa Clara, CA (US); Michael Z. Wu, San Jose, CA (US); Shanghsien Alex Rou, Fremont, CA (US); Steve Kuo-Hsing Hwang, San Jose, CA (US); Ed Yen, San Jose, CA (US)

(73) Assignee: Seagate Technology LLC, Cupertino, CA (US)

(*) Notice: Subject to any disclaimer, the term of this patent is extended or adjusted under 35 U.S.C. 154(b) by 1125 days.

(21) Appl. No.: 12/172,438

(22) Filed: Jul. 14, 2008

(65) Prior Publication Data

US 2010/0007989 A1   Jan. 14, 2010

(51) Int. Cl.
*G11B 5/74* (2006.01)
*G11B 5/851* (2006.01)
*G11B 5/65* (2006.01)
*G11B 5/667* (2006.01)
*G11B 5/73* (2006.01)

(52) U.S. Cl.
CPC  *G11B 5/851* (2013.01); *G11B 5/65* (2013.01); *G11B 5/667* (2013.01); *G11B 5/7325* (2013.01)
USPC .......................... 427/580; 427/548; 427/129

(58) Field of Classification Search
CPC .......... C23C 14/00; C23C 14/025; G11B 5/66
USPC ........ 427/580, 457, 540, 562, 548, 127, 128, 427/129, 130, 131, 132
See application file for complete search history.

(56) References Cited

U.S. PATENT DOCUMENTS

| | | | | |
|---|---|---|---|---|
| 5,536,585 | A  * | 7/1996 | Futamoto et al. | 428/611 |
| 5,976,715 | A  * | 11/1999 | Chen et al. | 428/836.1 |
| 6,301,088 | B1 * | 10/2001 | Nakada | 360/324.11 |
| 6,740,397 | B1 * | 5/2004 | Lee | 428/831.2 |
| 6,908,689 | B1 * | 6/2005 | Chen et al. | 428/611 |
| 6,967,061 | B1 * | 11/2005 | Munteanu et al. | 428/611 |
| 7,470,474 | B2 | 12/2008 | Sakawaki et al. | |
| 2005/0186450 | A1 * | 8/2005 | Takenoiri et al. | 428/827 |
| 2006/0222901 | A1 * | 10/2006 | Inamura et al. | 428/827 |
| 2006/0286413 | A1 * | 12/2006 | Liu et al. | 428/829 |
| 2007/0217067 | A1 * | 9/2007 | Nakamura et al. | 360/126 |

OTHER PUBLICATIONS

Duan et al., Magnetic Property and Microstructure Dependence of CoCrTa/Cr Media on Substrate Temperature and Bias, IEEE Transactions on Magnetics, vol. 28, No. 5, Sep. 1992, pp. 3258-3260.

(Continued)

*Primary Examiner* — Michael Cleveland
*Assistant Examiner* — Tabassom Tadayyon Eslami
(74) *Attorney, Agent, or Firm* — Hollingsworth Davis, LLC

(57) ABSTRACT

An embodiment of the invention relates to a perpendicular magnetic recording medium comprising (1) a substrate, (2) an interlayer comprising hexagonal columns and (3) a magnetic layer, wherein the magnetic layer is deposited applying a bias voltage to the substrate such that the magnetic layer comprises magnetic grains having substantially no sub-grains within the magnetic layer, and the magnetic layer has perpendicular magnetic anisotropy.

21 Claims, 7 Drawing Sheets

(56) References Cited

OTHER PUBLICATIONS

Lee et al., Effects of substrate bias on CoCrPt-SiO$_2$ magnetic recording media, Journal of Applied Physics 99, 08G910, 2006, 3 pages.

Lee et al., Control of resputtering in biased CoCrPt- SiO$_2$ media to enhance grain decoupling and grain size distribution, Journal of Applied Physics 103, 07F541, 2008, 3 pages.

ASME B46.1 "Surface Texture: Surface Roughness, Waviness and Law" American Society of Mechanical Engineers, Jun. 2003.

* cited by examiner

No M1 bias

M1 bias at − 500V

APPLYING BIAS VOLTAGE DURING FORMATION OF GRANULAR RECORDING MEDIA

BACKGROUND

A magnetic material is composed of a number of domains. Each domain contains parallel atomic moments and is magnetized to saturation, but the directions of magnetization of different domains are not necessarily parallel. Local preferred directions of magnetization depend upon the underlying microscopic structure of the material. Magnetic recording media microstructure generally includes grains or particles comprising regions of constant crystal structure or geometry. The local directions of easiest magnetization depend upon the geometry of the crystals. In the absence of an applied magnetic field, adjacent domains may be oriented in different directions, controlled by the underlying grain structure. The resultant effect of all these various directions of magnetization may be zero, as is the case with an unmagnetized specimen. When a magnetic field is applied, domain nearly parallel to the direction of the applied field become more prevalent at the expense of the others. A further increase in magnetic field causes more domains to rotate and align parallel to the applied field. When the material reaches the point of saturation magnetization, all domains are parallel to the applied field and no further domain growth or rotation would take place on increasing the strength of the magnetic field.

The ease of magnetization or demagnetization of a magnetic material depends on material parameters including composition, crystal structure, grain orientation, and the state of strain. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes.

In a perpendicular recording media, magnetization is formed easily in a direction perpendicular to the surface of a magnetic medium such that bits stand up and be perpendicular to surface, resulting from perpendicular anisotropy in the magnetic recording layer. On the other hand, in a longitudinal recording media, magnetization is formed in a direction in a plane parallel to the surface of the magnetic recording layer, resulting from longitudinal anisotropy in the magnetic recording layer.

A perpendicular recording media has layers that make bits stand up and be perpendicular to the surface. They are a Ruthenium (Ru)-containing layer having hexagonal Ru columns and $TiO_2$ or $SiO_2$ in the gaps between the Ru columns, and a CoCrPt layer grown on top of the Ru columns. The Ru-containing layer is generally sputtered at high pressure and $TiO_2$ or $SiO_2$ is filled the gap between columns in yet another high pressure process stage. The perpendicular recording media of the prior art have high porosity and low density in the media film stack and a high surface roughness of the media. As a result, the prior art perpendicular recording media suffer from two big failure modes: (a) poor scratch resistance in high RPM drives, and (b) poor corrosion performance in hot and humid environment.

SUMMARY OF THE INVENTION

An embodiment of the invention relates to a perpendicular magnetic recording medium comprising (1) a substrate, (2) an interlayer comprising hexagonal columns and (3) a magnetic layer, wherein the magnetic layer is deposited applying a bias voltage to the substrate such that the magnetic layer comprises magnetic grains having substantially no sub-grains within the magnetic layer, and the magnetic layer has perpendicular magnetic anisotropy.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
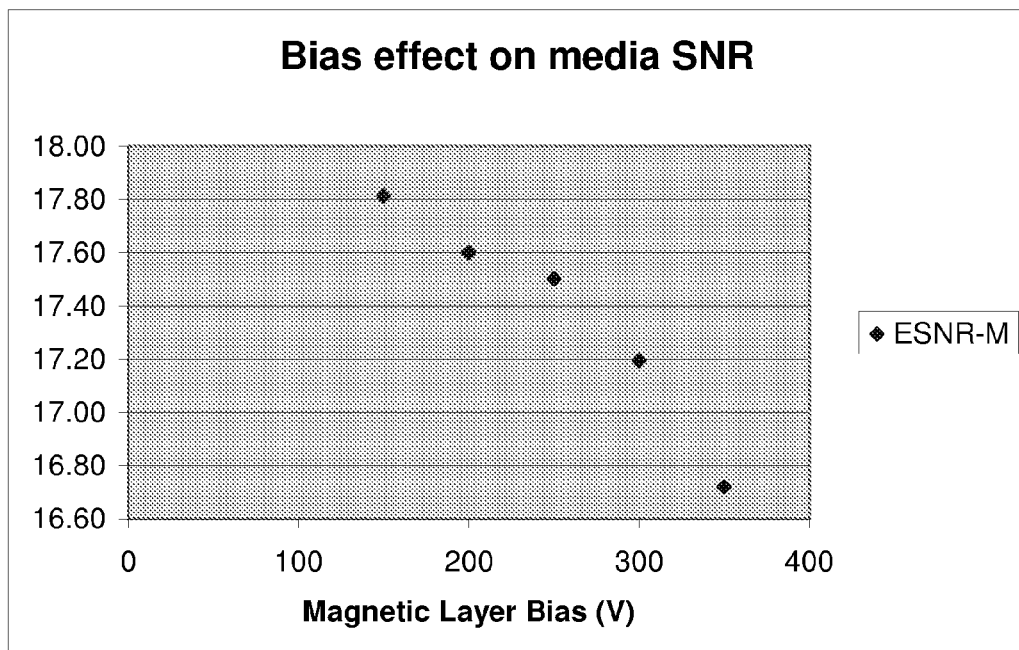
FIG. 1 shows that an increased bias on magnetic layer 1 decreased media signal-to-noise ratio (SNR).

A "soft magnetic material" is a material that is easily magnetized and demagnetized, with coercivity (Hc) below about 100 Oe. As compared to a soft magnetic material, a "hard magnetic" material is one that neither magnetizes nor demagnetizes easily.

This invention provides magnetic recording media suitable for high areal recording density exhibiting high SMNR. This invention achieves such technological advantages by forming a soft underlayer. The underlayer is "soft" because it made of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft underlayer" of this invention encompasses nanocrystallites in amorphous phase or any other form of a material so long the material exhibits no predominant sharp peak in an X-ray diffraction pattern as compared to background noise.

The term "substantially no sub-grains" refers to a property of a material containing grains, wherein less than 10% percent of the grains as observed by scanning electroscopic microscopy (SEM) have internal grain boundaries within the grains.

In accordance with this invention, "average surface roughness ($R_a$)" refers to the arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

The surface parameters of a layer such as that of the soft underlayer could be measured by atomic force microscope (AFM). The AFM used to characterize this invention has the trade name NanoScope.® The statistics used by the AFM are mostly derived from ASME B46.1 ("Surface Texture: Surface Roughness, Waviness and Law") available from the American Society of Mechanical Engineers, which is incorporated herein by reference.

In accordance with embodiments of this invention, the substrates that may be used in the invention include glass, glass-ceramic, NiP/aluminum, metal alloys, plastic/polymer material, ceramic, glass-polymer, composite materials or other non-magnetic materials. Glass-ceramic materials do not normally exhibit a crystalline surface. Glasses and glass-ceramics generally exhibit high resistance to shocks.

A preferred embodiment of a perpendicular recording medium of this invention could include multiple layers, one or more soft underlayers, one or more antiferromagnetic-coupled (AFC) layers, one or more seedlayers, one or more interlayers, one or more magnetic layers, one or carbon-containing corrosion resistant layers, and one or lubrication layers. The thickness of the soft underlayer is about 10-500 nm, preferably, about 20-35 nm. The thickness of the AFC layer is about 0.5-5 nm, preferably, about 1-5 nm. The thickness of seedlayer is about 0.1-10 nm, preferably, about 1-5 nm. The thickness of interlayer is about 5-30 nm, more preferably, about 10-20 nm. The thickness of magnetic recording layer is about 1-20 nm, preferably about 5-15 nm.

A preferred embodiment of this invention is a perpendicular recording medium comprising an amorphous soft underlayer and a recording layer. The amorphous soft underlayer should preferably be made of soft magnetic materials, and may in some cases further comprise lamination of one or more thin nonmagnetic layers. The recording layer should preferably be made of hard magnetic materials. The amorphous soft underlayer is relatively thick compared to other layers. Any layer between the amorphous soft underlayer and the recording layer is called an interlayer or an intermediate layer. An interlayer could be made of more than one layer of non-magnetic materials. An interlayer could also promote the desired properties of the recording layer.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

When soft underlayers are fabricated by magnetron sputtering on disk substrates, there are several components competing to determine the net anisotropy of the underlayers: effect of magnetron field, magnetostriction of film and stress originated from substrate shape, etc. A seedlayer, which could be optionally added as a layer lying in between the substrate and the soft underlayer, can often control anisotropy of the soft underlayer by promoting microstructure that exhibit either short-range ordering under the influence of magnetron field or different magnetostriction. A seedlayer could also alter local stresses in the soft underlayer.

Amorphous soft underlayers produced smoother surfaces as compared to polycrystalline underlayers. Therefore, it was recognized by this invention that the use of amorphous soft underlayer is one way of reducing the roughness of the magnetic recording media for high-density perpendicular magnetic recording. The amorphous soft underlayers materials include CoZrNb, CoTaZr, CoFeZr, FeCoZrB and FeCoB. In one variation, for example, the amorphous soft underlayer could comprise a material selected from the group consisting of $CoZr_yNb$ and $FeCoB_z$, wherein y is about 5 to 10 and z is about 10 to 15.

Another advantage of amorphous materials as soft underlayer materials is the lack of long-range order in the amorphous material. Without a long-range order, amorphous alloys have substantially no magnetocrystalline anisotropy. According to this invention, the use of amorphous soft underlayer is one way of reducing noise caused by ripple domains and surface roughness. The surface roughness of the amorphous soft underlayer is preferably below 0.4 nm, more preferably below 0.3 nm, and most preferably below 0.2 or 0.1 nm.

Furthermore, it was found during this invention that a granular magnetic recording layer, wherein the granular layer contains ferromagnetic grains and a non-ferromagnetic phase containing non-oxygen containing material(s), in conjunction with the soft underlayer, preferably, an amorphous soft underlayer, can decrease exchange coupling of the ferromagnetic grains.

In one embodiment, the invention generally provides a perpendicular recording medium comprising a magnetic layer, wherein the magnetic layer exhibits improved corrosion resistance while maintaining the magnetic properties suitable for high density perpendicular recording. One embodiment provides a perpendicular recording medium comprising a magnetic layer, wherein the magnetic layer comprises cobalt (Co), platinum (Pt), and at least one of molybdenum (Mo) and chromium (Cr), the magnetic layer having perpendicular magnetic anisotropy. Another embodiment provides a granular perpendicular recording medium comprising a granular magnetic layer, wherein the magnetic layer comprises Co, Pt, and at least one of Mo and Cr, the granular magnetic layer having perpendicular magnetic anisotropy.

For example, the magnetic layer of the present invention could comprise Co, Pt, and at least one of Mo and Cr, the magnetic layer having perpendicular magnetic anisotropy. In one embodiment, the magnetic layer comprises CoPtMo wherein the concentration of Mo is about 0.1 atomic % to about 20 atomic %, and preferably the concentration of Mo is about 0.5 atomic % to 6 atomic %. For example, a $CoPt_xMo_z$ alloy wherein x is between about 10 atomic % and 30 atomic %, and z is between about 0.1 atomic % and 12 atomic %, and preferably wherein x is between about 15 atomic % and 25 atomic %, and z is between about 0.5 atomic % and 6 atomic %.

In another embodiment the magnetic layer could comprise CoPtCr wherein the concentration of Cr is about 1 atomic % to about 20 atomic %, and preferably the concentration of Cr is about 3 atomic % to 12 atomic %. For example, a $CoPt_xCr_y$ alloy wherein x is between about 10 atomic % and 30 atomic %, and y is between about 1 atomic % and 20 atomic %, and preferably wherein x is between about 15 atomic % and 25 atomic %, and y is between about 3 atomic % and 12 atomic %.

In another embodiment the magnetic layer CoPtMo further comprise at least one of Cr, B, Ta, Nb, Si, Ni, and Ti. Still in another embodiment the magnetic layer CoPtCr further comprises at least one of the group consisting of Mo, B, Ta, Nb, Si, Ni, and Ti. For example, a cobalt-platinum-chromium-molybdenum (CoPtCrMo) alloy having a general formula $CoPt_xCr_yMo_z$ wherein x is between about 10 atomic % and about 30 atomic %, y is between about 1 atomic % and 20 atomic %, and z is between 0.1 atomic % and 20 atomic %, and preferably wherein x is between about 15 atomic % and about 25 atomic %, y is between about 3 atomic % and 12 atomic %, and z is between 0.5 atomic % and 6 atomic %.

In one embodiment of the invention, the scratch resistance and corrosion performance of a disk media are improved by increasing the density of the film stack by applying negative bias on the disk media and creating Argon ions bombardment on the surface of the disk media. Besides bias, another parameter that can influence the density of the film stack of the disk media is the process pressure, with lower pressure resulting in a higher density. Though, it would found that the dominating factor that controls the density of the film stack of the disk media is the bias applied to the disk media during processing of the disk media.

In one embodiment, the nonmagnetic phase in the granular layer could be formed by reactive sputtering. The resulting granular layer contains a nonmagnetic phase distributed preferentially between magnetic grains to decrease exchange coupling. Examples of the materials of the nonmagnetic phase of the granular layer include metal oxide that provides decoupling between magnetic grains. Preferred examples include oxides of cobalt, boron, aluminum, titanium, silicon, zirconium, vanadium, tantalum, chromium, and molybdenum. This process thus provides a controlled method to improve and optimize granular perpendicular recording media by reducing exchange coupling.

In some embodiments of the invention, the interlayer comprises a Ru-containing alloy deposited so as to form a strong c-axis normal to the film-plane crystallographic growth orientation. In some embodiments the strong c-axis growth orientation is formed by initiating Ru-alloy sputter at low argon gas pressure onto a <111> oriented seed layer on an amorphous soft underlayer material. In some embodiments, Ru-alloy sputter gas pressure is increased to above 15 mTorr so as to form a Ru-alloy surface topography including grains separated by grain boundary grooves, by the method of "sputter shadowing." In some embodiments, the granular recording layer is deposited at a sputter pressure above 15 mTorr so as to increase the phase separation between the magnetic Co—Pt containing metal alloy phase and the nonmagnetic phase comprising an element reacted with a material such as carbon, nitrogen, or other halogen. In more preferred embodiments, the sputter system is a static or pass-through production deposition system producing more than 300 units per hour, and the sputter pressure of the Ru-alloy and granular recording layers are both between 25-100 mTorr.

Non-oxide materials such as titanium nitride, titanium carbide, tantalum nitride, tantalum carbide, boron nitride, cobalt nitride, cobalt carbide, and other metal carbides, nitrides, and other halides may also be included in the sputter target and directly sputtered. Such method can also reduce exchange decoupling by formation of non-magnetic grain boundary phases.

Generally, lowering exchange coupling of perpendicular recording media causes their magnetic hysteresis loops to become more sheared, and correspondingly have a larger difference between coercive field (Hc) and nucleation field (Hn). There are many prior examples of this relationship between exchange coupling and Hc-Hn for CoCr-based and reactive oxygen-based sputtered perpendicular recording media.

Common magnetic hysteresis loop parameters of interest for perpendicular media are Hc and Hn. Generally one would want fairly high Hc and a small, positive value of Hn. A figure of merit for exchange coupling is Hc-Hn. Larger values of Hc-Hn correlate to less exchange coupling. Good media generally have high values of Hc-Hn combined with high Hc, above 4 kOe.

Corrosion tests are done by subjecting the sample media to an environment having 80% relative humidity at 80 degree C. for at least four days. Then the content of CoOx on the disk surface was measured by electron spectroscopy for chemical analysis (ESCA). The main corrosion product is CoOx.

The advantageous characteristics attainable by the present invention, particularly as related to reduction or elimination of DC noise and increase of media SNR, are illustrated in the following examples.

EXAMPLES

All samples described in this disclosure were fabricated with DC magnetron sputtering except carbon films were made with AC magnetron sputtering. Example data demonstrating the reduction of exchange coupling by reactive sputtering are explained herein.

A magnetic recording medium having an aluminum substrate was made having the layer structure shown in the table below. This table also provides the processing conditions (pressure and bias voltage applied to different layers on the substrate).

| Film stack | Material | Pressure | Thickness | Bias Voltage |
| --- | --- | --- | --- | --- |
| Carbon | CHN | 1-5 mTorr | 32 Å | 150 V |
| Magnetic 2-3 | CoCrPtB | 1-5 mTorr | 100 Å | 150-250 V |
| Magnetic 1 | CoCrPt(TiO2) | 30-100 mTorr | 100 Å | 150-300 V |
| Interlayer 2 | Ru | 30-100 mTorr | 100 Å | 50 V |
| Interlayer 1 | RuCr | 1-5 mTorr | 150 Å | 250 V |
| Seedlayer | Ta | 1-5 mTorr | 25 Å | 50 V |
| SUL | FeCoCrB | 1-5 mTorr | 275 Å | 250 V |
| AFC | Ru | 1-5 mTorr | 17 Å | 0 V |
| SUL | FeCoCrB | 1-5 mTorr | 275 Å | 250 V |

Applicants found that the application of bias on interlayer 2 and/or magnetic layer 1 had considerable improvement in the performance of the magnetic recording medium. The higher the bias, the better was the scratch and corrosion performance. However, the electrical performance appeared to decrease with a higher bias as the increased bias on magnetic layer 1 decreased the media signal-to-noise ratio (SNR). These conclusions are drawn from FIGS. 1, 2 and 3.

FIG. 1 shows that an increased bias on magnetic layer 1 decreased the media signal-to-noise ratio (SNR). The Y axis of FIG. 1 represents the media SNR, which is an important parameter to judge media recording performance.

Figure 2:
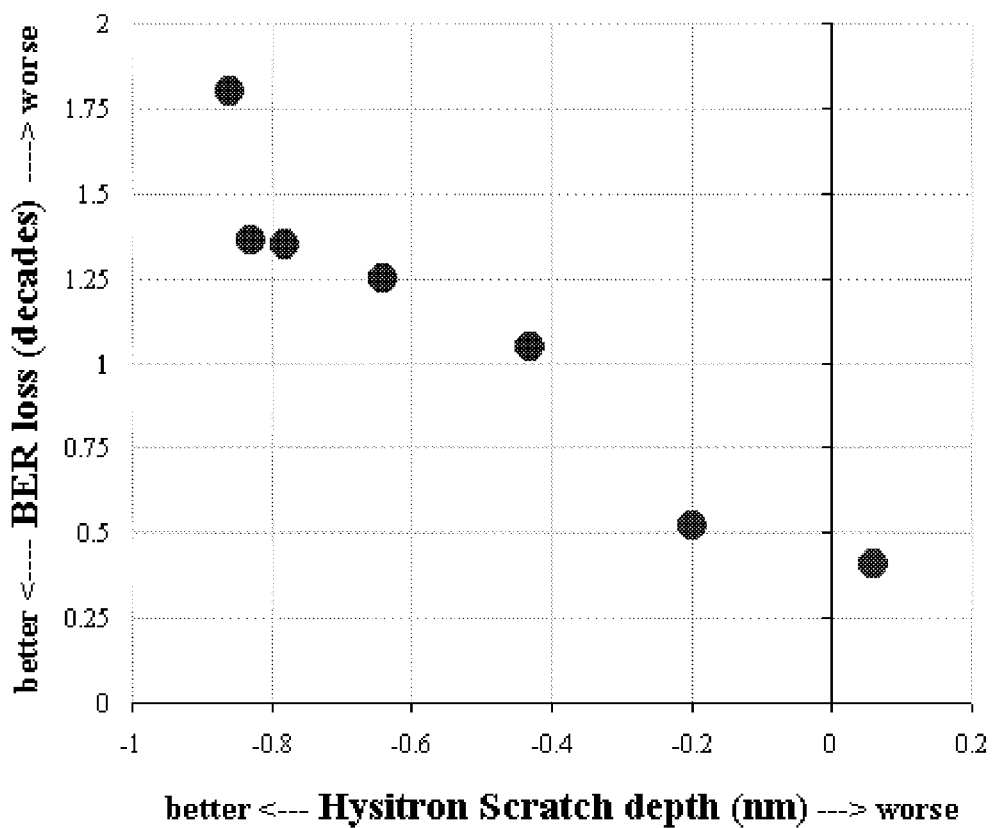
FIG. 2 shows that even though the bit error rate (BER) loss is increased with increased bias on magnetic layer 1, the scratch performance of the media is improved.

FIG. 2 shows that even though the bit error rate (BER) loss is increased with an increased bias on magnetic layer 1, the scratch performance of the media is improved. The Y axis of FIG. 2 represents the BER loss, which is the difference between the experimental media bit error rate and the reference media bit error rate. The X axis of FIG. 2 represents the hysitron scratch depth, which is the difference between the depth of mechanical scratch by a stylus under a controlled load of the experimental media and of the reference media tested under the same condition.

Figure 3:
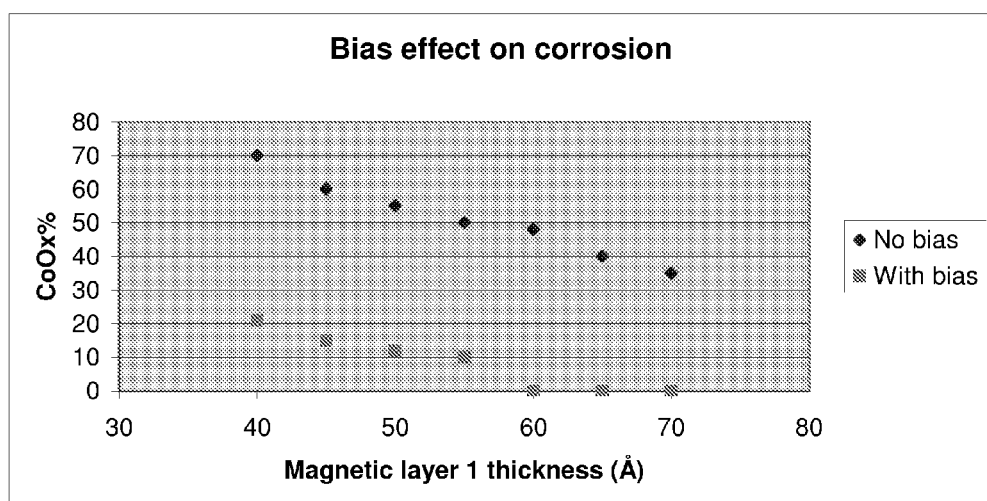
FIG. 3 shows corrosion of the magnetic media as a function of the thickness of magnetic layer 1, with and without applying bias to magnetic layer 1.

FIG. 3 shows corrosion of the magnetic media as a function of the thickness of magnetic layer 1, with and without applying bias to magnetic layer 1. Note that the thickness of magnetic layer 2 was kept constant at 65 Å. Preferably, the CoOx % should to be less than 10%. In FIG. 3, the Y axis shows the content of CoOx on the disk surface as measured by ESCA according to the corrosion test described above. FIG. 3 shows the unexpected results of applying bias—the media without applying bias could not pass the corrosion test as the CoOx % was greater than 10% for all thicknesses of magnetic layer 1 in the range of 40 to 70 Å, while the media made by applying bias passed the corrosion test for magnetic layer 1 thickness of 55 Å and higher.

Furthermore, it was found that bombardment by Argon ions increases the density of the film stack, thereby improving the scratch and corrosion resistance. Applicants also concluded that densification of the magnetic layer results from more integrated grains and larger grain separations by driving oxides to the grain boundaries, which in turn produces lower exchange coupling between the grains. This conclusion was drawn from FIG. 4.

Figure 4:
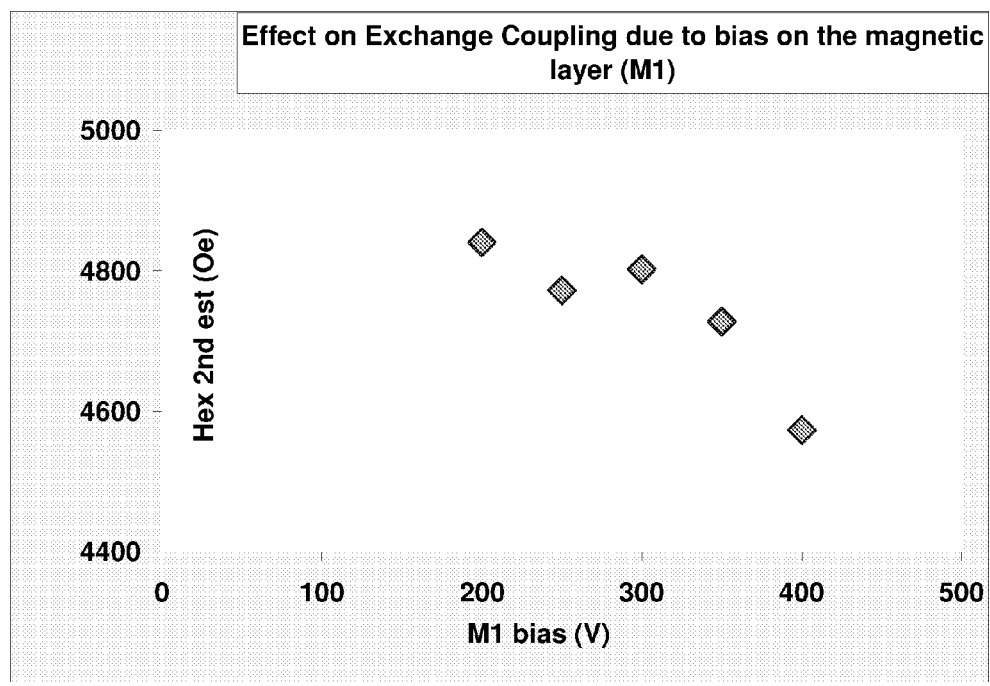
FIG. 4 shows the effect of applying bias on the magnetic storage layer exchange coupling.

FIG. 4 shows the effect of applying bias on the magnetic storage layer exchange coupling. Less exchange coupling was observed with increased bias of the first magnetic layer. This means that the grain boundaries after consolidation of the main grains widen due to bias sputtering. In FIG. 4, the Y axis shows Hex $2^{nd}$ est, which is the calculated media magnetic exchange coupling strength by the $2^{nd}$ estimation method.

Figure 5A:
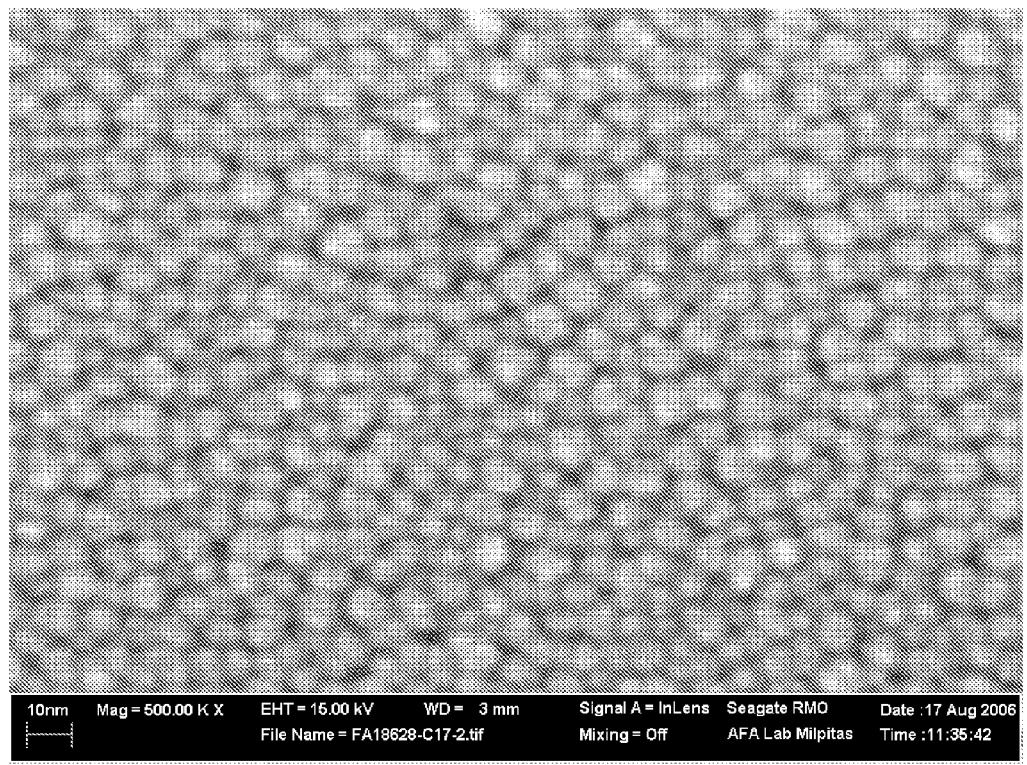
FIG. 5 shows ultra-high resolution SEM micrographs of media wherein the first magnetic layer was deposited (a) with no bias (FIG. 5a) and (b) with a negative bias of 500V (FIG. 5b).
Figure 5B:
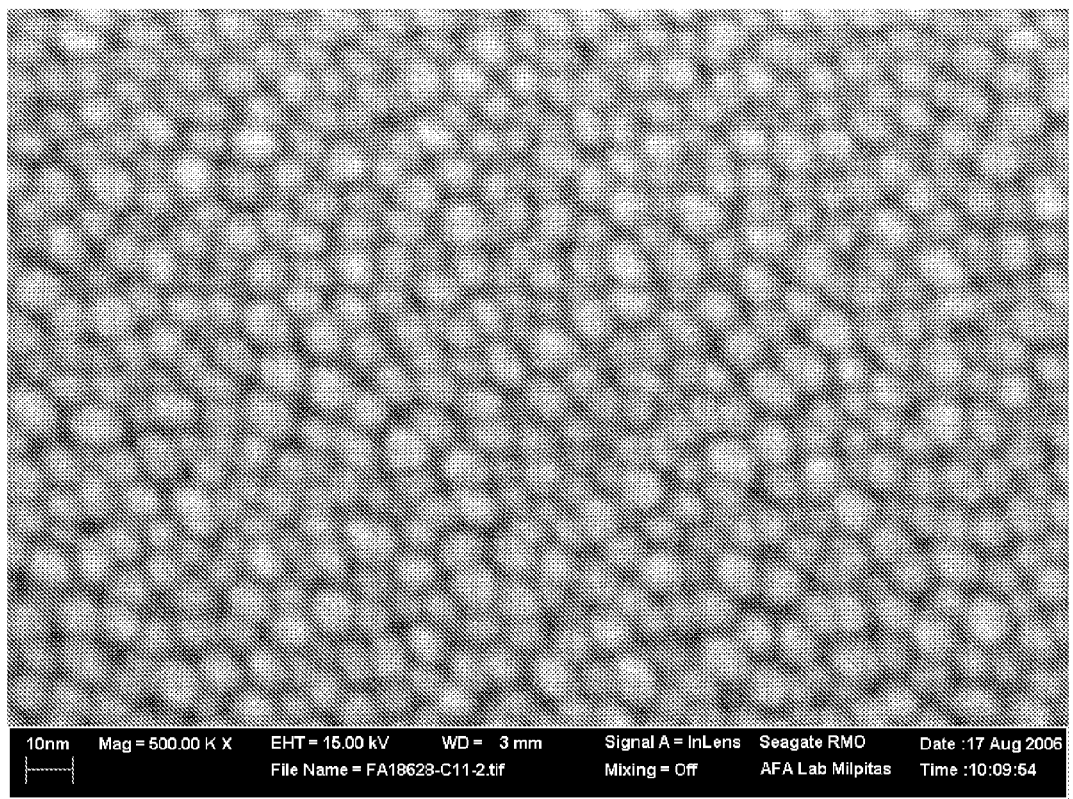
Figure 6:
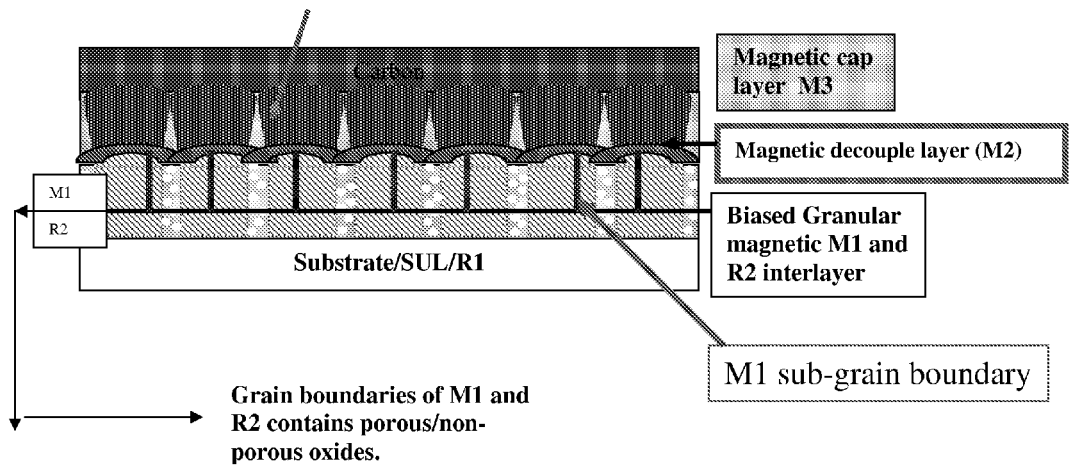
FIG. 6 shows cartoons to illustrate the distinct structural changes in the magnetic layer deposited (a) deposited without applying bias during sputtering (top cartoon) and (b) by applying bias during sputterin (bottom cartoon).
Figure 6:
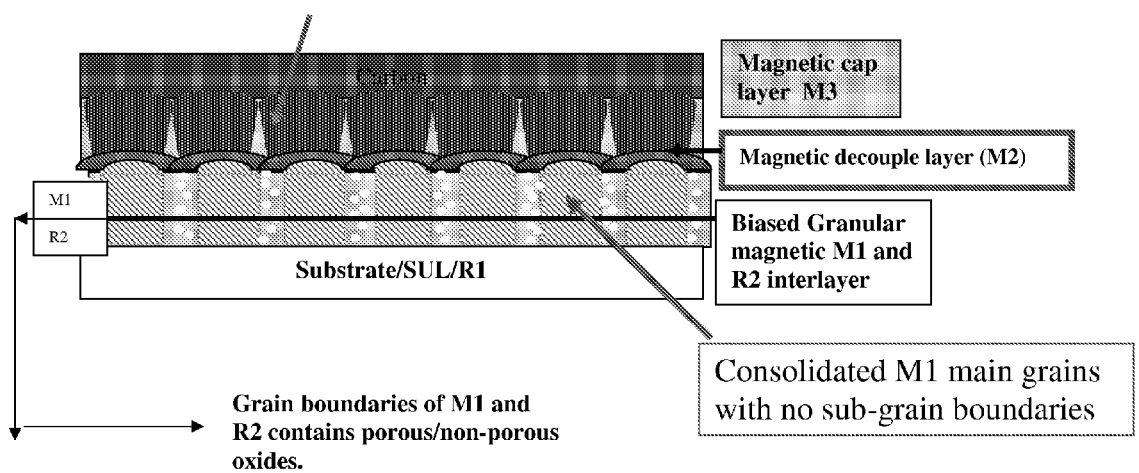

It is evident from the ultra high resolution SEM analysis and subsequent grain structure illustrations in FIGS. 5 and 6, respectively, of the magnetic recording media of an embodiment of this invention that biased sputtering effectively reduces the sub-grain growth of magnetic layer 1. The reduction of sub-grains promotes densification of the magnetic layer.

FIG. 5 shows ultra-high resolution SEM micrographs of media wherein the first magnetic layer was deposited (a) with no bias (see FIG. 5a) and (b) with a negative bias of 500V (see FIG. 5b). The SEM micrographs show distinct structural changes. High bias sputtering created a first magnetic layer having a consolidated high density and uniform polycrystalline structure without sub-grains.

FIG. 6 shows cartoons to illustrate the distinct structural changes in (a) a magnetic layer deposited without applying bias during sputtering (top cartoon) and (b) a magnetic layer deposited while applying bias during sputtering (bottom cartoon—which is an embodiment of the present invention). The magnetic layer of the embodiments of the present invention is substantially without sub-grains while the magnetic layer deposited without applying bias has sub-grains within the grains of the magnetic layer.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein by reference. The implementations described above and other implementations are within the scope of the following claims.

The invention claimed is:

1. A method, comprising:
applying a bias voltage on a substrate;
depositing on the substrate an interlayer, wherein the interlayer comprises Ru;
depositing a granular magnetic layer on the interlayer while applying the bias voltage and pressure, wherein the magnetic layer has perpendicular magnetic anisotropy and comprises:
magnetic grains comprising Co, Pt, and at least one of Mo and Cr, and
a non-magnetic grain boundary phase between the magnetic grains; and wherein the bias voltage and pressure are selected to control sub-grain formation in the magnetic grains so that less than about 10% of the magnetic grains have internal sub-grain boundaries.

2. The method of claim 1, wherein the bias voltage is between about 150 V and about 300 V.

3. The method of claim 2, wherein the pressure is about 30 to about 100 mTorr.

4. The method of claim 1, wherein the interlayer is deposited applying a bias voltage of at least 50 V on the substrate.

5. The method of claim 1, further comprising depositing an antiferromagnetic layer between the substrate and interlayer, wherein the anti-ferromagnetic layer is deposited applying about 0 V bias on the substrate.

6. The method of claim 5, further comprising depositing a first soft magnetic underlayer between the substrate and the anti-ferromagnetic layer and depositing a second soft magnetic underlayer between the anti-ferromagnetic layer and the interlayer, wherein the first and second soft magnetic underlayers are deposited applying at least 250 V bias voltage on the substrate.

7. The method of claim 1, wherein the interlayer comprises:
a first layer comprising an alloy of Ru; and
a second layer of Ru; wherein the first layer is deposited at a bias voltage of about 250V and a pressure of about 1 mTorr to about 5 mTorr and the second layer is deposited at a bias voltage of about 50V and a pressure of about 30 mTorr to about 100 mTorr.

8. The method of claim 1, wherein the non-magnetic grain boundary phase comprises at least one of a metal nitride, a metal carbide, and a metal halide.

9. The method of claim 1, wherein the non-magnetic grain boundary phase comprises a metal oxide.

10. The method of claim 9, wherein the non-magnetic grain boundary phase comprises at least one of a metal nitride, a metal carbide, and a metal halide.

11. The method of claim 1, further comprising bombarding a surface of the magnetic layer with Ar ions.

12. The method of claim 1, wherein the bias voltage is a negative bias voltage.

13. A method, comprising:
depositing an interlayer comprising Ru on a substrate;
depositing a granular magnetic layer on the interlayer while applying a bias voltage, the magnetic layer having perpendicular magnetic anisotropy and comprising:
magnetic grains comprising Co, Pt, and at least one of Mo and Cr, and
a non-magnetic grain boundary phase between the magnetic grains; and wherein the bias voltage is selected so that less than 10% of the magnetic grains include sub-grains and the granular magnetic layer forms less than 10 atomic percent CoOx after exposure to an environment having 80% relative humidity at 80° C. for at least four days.

14. The method of claim 13, wherein depositing the granular magnetic layer further comprises applying a pressure, wherein the pressure is about 30 mTorr to about 100 mTorr and the bias voltage is about 150 to about 300 V.

15. The method of claim 14, wherein depositing the interlayer comprises depositing an interlayer of Ru while applying a bias voltage of about 50V and a pressure of about 30 to about 100 mTorr.

16. A method, comprising:
applying a first bias voltage to a substrate;
during application of the first bias voltage, depositing on the substrate an interlayer of Ru;
applying a second bias voltage to the interlayer;
during application of the second bias voltage, depositing a granular magnetic layer on the interlayer, wherein the magnetic layer
has perpendicular magnetic anisotropy,
comprises magnetic grains that include Co, Pt, and at least one of Mo and Cr,
includes a non-magnetic grain boundary phase between the magnetic grains, and
includes less than about 10% sub-grains within the magnetic grains.

17. The method of claim 16, further comprising:
applying a first pressure during application of the first bias voltage; and
applying a second pressure during application of the second bias voltage.

18. The method of claim 17, wherein the first pressure is about 30 mTorr to about 100 mTorr, the second pressure is about 30 mTorr to about 100 mTorr, the first bias voltage is about 50 V, and the second bias voltage is about 150 V to about 300 V.

19. The method of claim 18, further comprising:
depositing a first interlayer comprising RuCr;
depositing the interlayer of Ru on the first interlayer; and
depositing at least one additional magnetic layer on the magnetic layer.

20. The method of claim 19, wherein:
depositing the first interlayer comprises depositing the first interlayer while applying a bias voltage of about 250 V and a pressure of about 1 mTorr to about 5 mTorr; and
depositing the additional magnetic layer comprises depositing the additional magnetic layer while applying a bias voltage of about 150 V to about 250 V and a pressure of about 1 mTorr to about 5 mTorr.

21. The method of claim 16, wherein the magnetic layer forms less than 10 atomic percent CoOx after exposure to an environment having 80% relative humidity at 80° C. for at least four days.

* * * * *